United States Patent
Drummond et al.

(10) Patent No.: US 6,287,423 B1
(45) Date of Patent: Sep. 11, 2001

(54) PAPER COMPOSITION FOR IMPROVED SHEET PROPERTIES

(75) Inventors: Donald Kendall Drummond, Quakertown; Patrick Clinton Wernett, Upper Black Eddy, both of PA (US)

(73) Assignee: Minerals Technologies Inc., Bethlehem, PA (US)

(*) Notice: Subject to any disclaimer, the term of this patent is extended or adjusted under 35 U.S.C. 154(b) by 0 days.

(21) Appl. No.: 09/286,745

(22) Filed: Apr. 6, 1999

(51) Int. Cl.[7] ............... D21H 17/37; D21H 17/63; D21H 17/28
(52) U.S. Cl. ............ 162/168.1; 162/175; 162/158; 162/168.6; 162/181.1
(58) Field of Search .................. 162/158, 164.5, 162/166, 168.1–168.6, 175, 179, 181.1–181.3; 524/814, 3, 5; 526/304, 258, 264, 307.2; 106/790, 696, 725, 727, 778, 823, 690, 503

(56) References Cited

U.S. PATENT DOCUMENTS

| | | |
|---|---|---|
| 3,692,673 | 9/1972 | Hoke . |
| 3,709,780 | 1/1973 | Slagel et al. . |
| 3,926,718 | 12/1975 | Guilbault et al. . |
| 4,555,558 | 11/1985 | Giddings et al. . |
| 5,028,271 * | 7/1991 | Huddleston et al. ............... 106/720 |
| 5,064,730 * | 11/1991 | Takano et al. ............... 428/694 BG |
| 5,075,401 | 12/1991 | Zhang . |
| 5,336,316 * | 8/1994 | Dawson et al. ............... 106/724 |
| 5,368,690 * | 11/1994 | Solarek et al. ............... 162/175 |
| 5,538,596 * | 7/1996 | Satterfield et al. ............... 162/164.5 |
| 5,627,145 * | 5/1997 | Thevissen ............... 507/224 |
| 5,880,236 * | 3/1999 | Konrad et al. ............... 526/304 |
| 5,942,086 * | 8/1999 | Owen ............... 162/135 |
| 5,985,992 * | 11/1999 | Chen ............... 524/814 |
| 5,988,279 * | 11/1999 | Udarbe et al. ............... 166/293 |
| 5,989,391 * | 11/1999 | Watanabe et al. ............... 162/164.5 |

* cited by examiner

Primary Examiner—Jose Fortuna
(74) Attorney, Agent, or Firm—Marvin J. Powell

(57) ABSTRACT

Novel polymers are provided having phosphonated and sulphonated substituent groups such that the polymers is multifunctional in its use. Optional amide substituents are used to reduce electrostatic charge density or for hydrogen bonding. An advantage of the polymer is the flexibility of using it for multiple purposes. A particular application is for bonding paper fillers and paper fiber together.

5 Claims, 2 Drawing Sheets

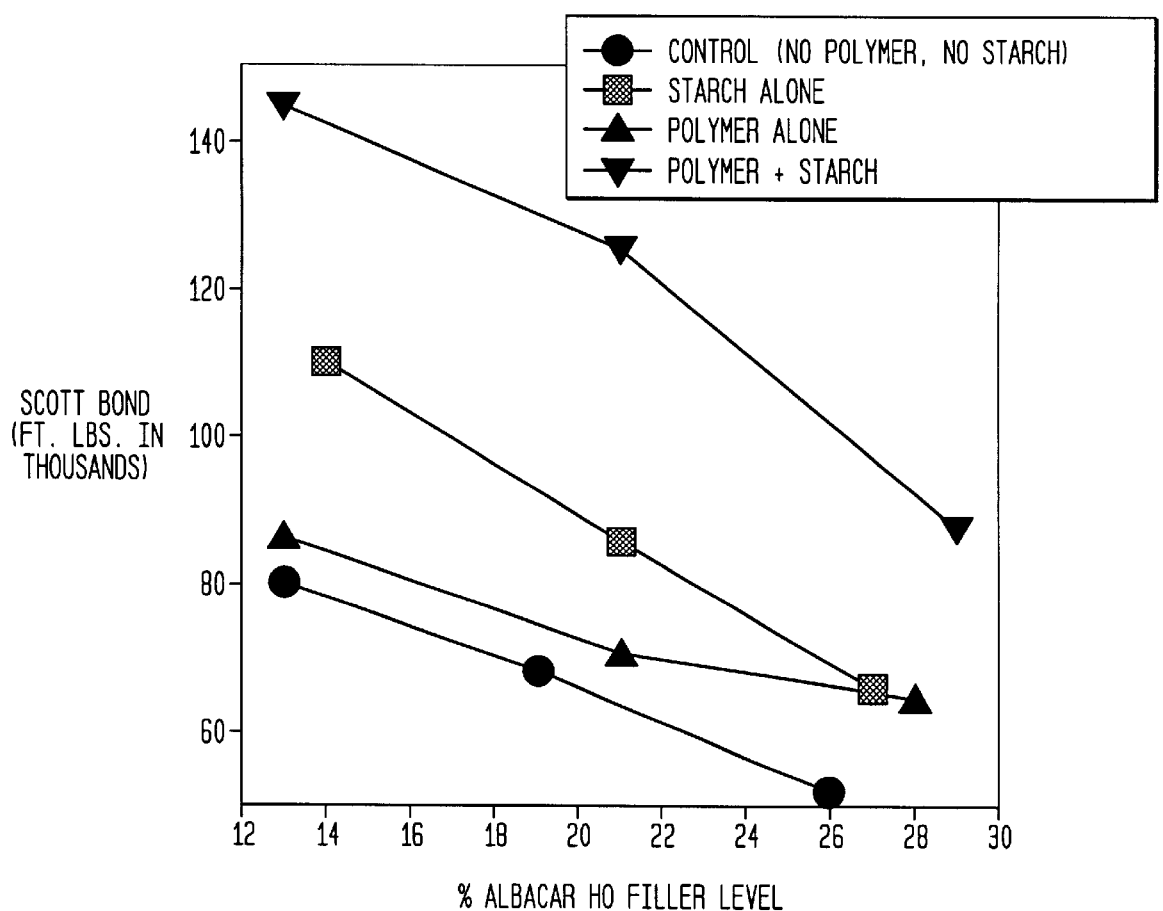

PAPER COMPOSITION FOR IMPROVED SHEET PROPERTIES

FIELD OF THE INVENTION

The present invention relates to novel polymer compositions which contain amide, sulfonate and/or phosphonate groups and method of use, including, but not limited to, paper making methods, particularly as retention or strength aids.

BACKGROUND OF THE INVENTION

Currently, filler levels in paper are limited, in part, by paper strength losses as filler levels increase. Minimum strength requirements prohibit the paper maker from adding more filler which is desirable because fillers are generally less expensive than the wood fiber that they replace. The ability to add more filler would allow the paper maker to reduce paper production costs by replacing the more expensive fiber. In order to achieve higher filler levels, the paper maker needs fillers, additives or processes which increase paper strength. Historically, the paper maker has used filler modification, wet end additives and fiber modifications to achieve higher strength levels in paper. Filler modifications have included changing filler type, changing filler particle size and surface treatments of fillers. Wet end additives have included synthetic and natural polymers such as polyacrylamides and starches. Fiber modifications have included changing fiber type and fiber processing.

In general, the paper industry is trending toward higher filler levels to reduce costs and as a result is continually looking for ways to improve paper strength. To achieve this, a new generation of strength aids is required for the paper industry.

In U.S. Pat. No. 3,709,780, there is disclosed paper products having improved strength properties by adding to the cellulose paper dispersion a chitin-based compound of a graft copolymer of 2-acrylamide-2-methylpropanesulfonic acid (AMPS) onto a chitosan substrate.

In U.S. Pat. No. 3,692,673, there is disclosed polymers of acrylamido sulfonic acids, and their salts, which are useful as flocculants or aqueous systems.

In U.S. Pat. No. 4,555,558, there is disclosed water soluble terpolymers of AMPS; N,N-dimethylacrylamide; and acrylonitrile. These terpolymers are reported to provide high temperature fluid loss additives and rheology stabilizers for high calcium-containing, brine clay drilling fluids.

In U.S. Pat. No. 3,926,718, there is disclosed the use of water-soluble block polymers having blocks derived from a water-soluble monomer and blocks derived from N-vinyl pyrrolidone. These polymers are reported to perform as drainage and retention aids for paper webs where the polymer is added to a pulp slurry.

In U.S. Pat. No. 5,075,401, there is disclosed a graft copolymer made by a free radical reaction mechanism. The copolymer uses polymeric units of acrylamide, acrylic acid and/or AMPS.

BRIEF DESCRIPTION OF THE DRAWINGS

FIG. 2 depicts the result of the present invention respecting Scott bond results from a handsheet study, eg. Example 4 herein.

SUMMARY OF THE INVENTION

Figure 1:
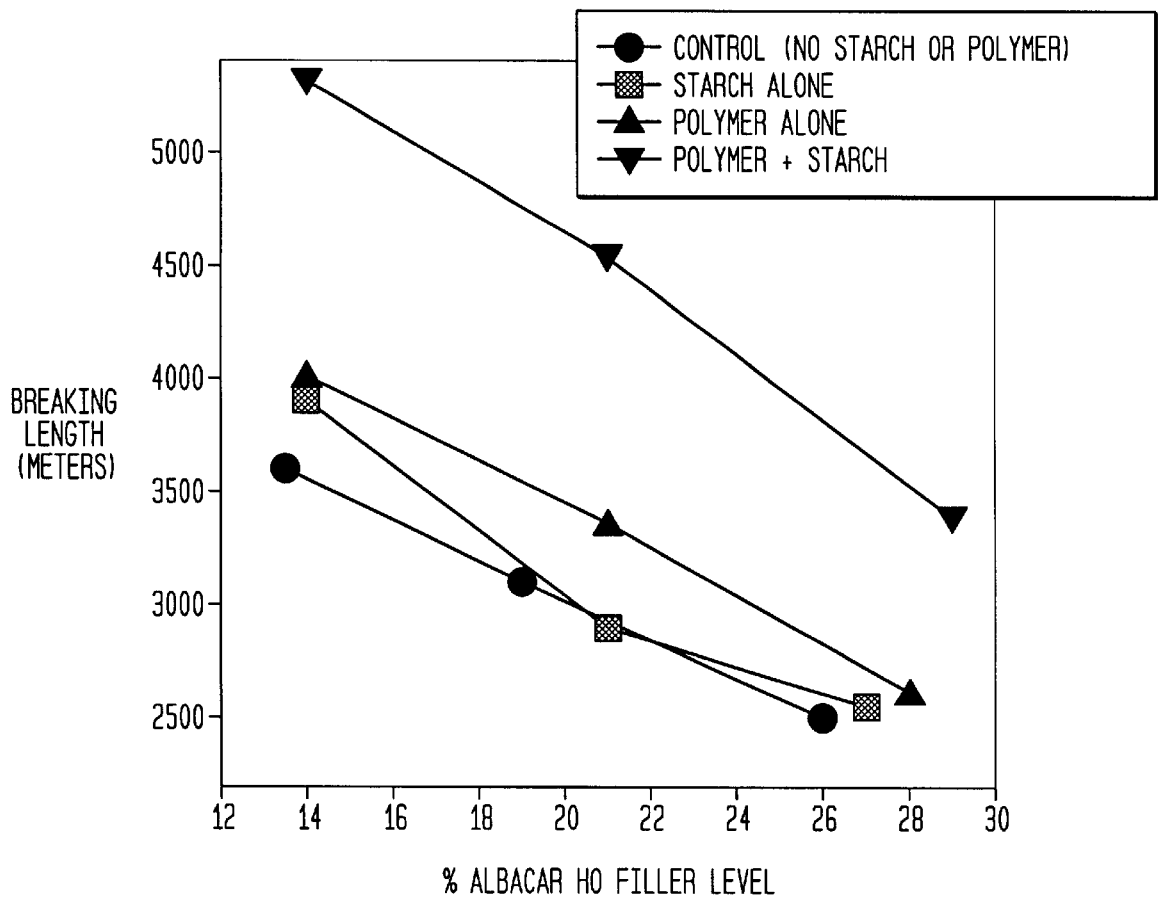
FIG. 1 depicts the results of the present invention respecting breaking length results from a handsheet study, eg. Example 4 herein.

An object of the present invention is to provide a polymer having varied substituent groups having varied functions or utilities. One specific objective is to provide a polymer useful for binding mineral fillers, particularly to polysaccharide materials, such as paper pulps and the like. Another object is to provide a polymer useful as a binder in non-paper applications, such as rubbers, sealants, plastics, modifiers, pharmaceuticals etc. Such and other objectives are achieved in that the present invention provides novel polymers having phosphonated and sulphonated substituent groups such that the polymer is multifunctional in its use. Optional amide substituents are used to reduce electrostatic charge density or for increasing hydrogen bonding. An advantage of the polymer is the flexibility of using it for multiple purposes. Other advantages will be discerned by those skilled in the art in familiarizing themselves with this specification.

A further object of the present invention is to provide a method for improving the strength in paper by the addition of the foregoing polymers to a paper furnish. An advantage of such methods is an unexpected result in the strength of paper made using some of these polymers.

DETAILED DESCRIPTION OF THE INVENTION

One embodiment of the present invention is a polymer composition having a polymeric core, one or more phosphonated substituents effective for bonding with an inorganic material, and one or more sulphonated substituents effective for bonding with a polysaccharide material.

Preferably, the polymeric core comprises one or more polymer units selected from polymerizable monomeric units, such as by condensation or free radical methods, preferably from allylic units, epoxidic units, and vinylic units. The polymeric core can be composed of varying, proportions or sequences of substituted or unsubstituted monomeric (or polymeric) units of allylic units, epoxidic units and vinylic units. Not all allylic unit, epoxidic units, or vinylic units need be the same as the other respective allylic units, epoxidic units, or vinylic units, but they can be. Such difference can result from hydrolysis reactions, among others, and whether intended or not. Such allylic, epoxidic and vinylic units can have one or more of the phosphonated or sulphonated substituents attached before or after polymerization. Such units of the core can be repeating in a predictable sequence or repeat randomly.

An allylic unit can be one derived from a compound with the moiety of $CH_3CH_2$=CH—. A preferred allylic unit is a polyacrylamide unit. The epoxidic unit can be one derived from a compound with the moiety of

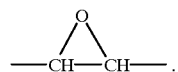

The vinylic unit can be derived from a compound with the moiety of $CH_2$=CH—. A preferred vinylic unit is vinylphosphonate. Any one or more of the hydrogen atoms may be substituted before during or after polymerization. The proportions of allylic units, epoxidic units, and vinylic units can vary widely, or a polymer can be composed of only one type of unit alone or various combinations thereof. Whether a polymer is made of only allylic units, only epoxidic units, only vinylic units or a combination of these types of units, the units of each type may be the same or different because of substitution. In a more preferred embodiment, the amount or proportion of the polyacrylamide units or the epoxidic units to the balance of the polymer composition is effective for reducing the electrostatic charge density of the polymer composition or for increasing the hydrogen bonding to the polysaccharide material or, more preferably, both.

Polysaccharide materials include cellulose, starch and other similar natural and synthetic glycosidic-linked saccharides. Preferred polysaccharides are cellulose, more preferably wood fiber and bagasse; even more preferably, cellulosic fibers for paper production.

In one embodiment, the present invention is a polymer composition comprising, a various mixture of linking monomeric units, amide or epoxide monomeric units, phosphonated monomeric units and sulphonated monomeric units.

The preferred linking monomeric unit can be represented by the formula —CH—CH($R_1$)—, wherein $R_1$ is hydrogen, a halogen or a lower alkyl.

The cationic or neutrally charged amide monomeric unit can be represented by the formula:

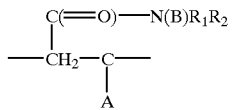

wherein "C" is carbon; "O" is oxygen; "N" is nitrogen; "A" is an unsubstituted or substituted ($C_1$–$C_6$) alkylene or hydrogen, wherein the substituents are independently selected from ($C_1$–$C_3$) alkyls and halogens, "B" is hydrogen, hydroxyl, or ether; preferably hydrogen. The nitrogen, N, can also be a quaternary nitrogen, including, but not limited to, combinations of the groups above; and "$R_1$" and "$R_2$" are each independently hydrogen, halogen or a ($C_1$–$C_3$) alkyl. A, if not hydrogen is an ($C_1$–$C_6$) alkylene e g., methylene, ethylene propylene, butylene, pentylene or hexylene. Such alkylenes can have a ($C_1$–$C_3$) alkyl substituent, e.g., methyl, ethyl or propyl. The halogen which can be a substituent on an alkyl or alkylene chain herein is selected from bromine, chlorine and fluorine atoms. For $R_1$ and $R_2$ the ($C_1$–$C_3$) alkyls are metlhyl, ethyl and n-propyl.

The preferred epoxide monomeric unit can be represented by the formula —CHR—O—$CH_2$, wherein R is hydrogen or lower alkyl or alkylene, e.g. alkylene having one to six carbon atoms.

The preferred phosphonated monomeric unit can be represented by the formula

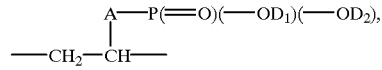

wherein "P" is phosphorus; "O" is oxygen; and "A" is selected from an unsubstituted or substituted ($C_0$–$C_6$) alkylene, wherein the substituent is independently selected from ($C_1$–$C_3$) alkyls and halogens, or from carbonyl (—CO—), carbonylaminos (—CO—N—, where "E" hydrogen, hydroxyl, or ether), alkylenecarbonylaminos (e.g. —($CH_2$)$_x$ —CO—NE—, where x is an integer), carbonylaminoalkylenes (e.g. —CO—NE—($CH_2$)$_x$—), or alkylenecarbonylaminos-alkylenes (e.g. —($CH_2$)$_x$—CO—NE—($CH_2$)$_x$—); and "D" is a hydrogen proton or a salt moiety selected from aluminum, calcium, iron, lithium, magnesium, potassium, sodium, titanium and zinc ions. When in a salt moiety, the substituents are such that results in an electronic balance for the substituent group. The "A" is an ($CO_0$–$C_6$) alkylene. e.g., nothing, methylene, ethylene, propylene. butylene, pentylene or, hexylene. However, such preferred alkylenes can have one or more ($C_1$–$C_3$) alkyl substituent(s). e.g., methyl, ethyl, or propyl. The halogen which can be a substituent on an alkyl chain herein is selected from bromine, chlorine, and fluorine atoms. Such halogens can be substituents on the alkylene chain also. When "A" is represented as —C(=O)—N(—E)— then E is hydrogen, hydroxyl, or ether; preferably hydrogen. The nitrogen, N, can also be a quaternary nitrogen, including, but not limited to, combinations of the groups above.

When "D" is a hydrogen proton, —$PO_3$—D can be represented as —P(=OH)(×O)(=OH). When "D" is a salt moiety, then —$PO_3$—D can be shown by examples as —$(PO_3)^{-2}(Na^{+1})_2$ when sodium is the moiety; or —$(PO_3)^{-2}(Ca^{+2})$, when calcium is the moiety.

"D" may also represent a pairing of hydrogen and salt moiety. e.g. —$(PO_3)H^{+1}Na^+$.

The inorganic material is preferably a mineral containing material such as that which can be used for a filler in paper or non-paper products as hereinafter described. Although such is contemplated in the present invention, the invention is not necessarily limited to such inorganic materials. In some preferred embodiments, the inorganic material is a filler or other additive for paper compositions. In yet other embodiments, the inorganic material is a filler or other additive for non-paper compositions, such as plastics. A preferred inorganic material is one derived from or made with calcium containing matter, such as some clays or natural calcium carbonate. Another preferred inorganic material is precipitated calcium carbonate.

The preferred sulphonated monomeric unit can be represented by the formula

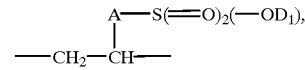

wherein "S" is sulfur "O" is oxygen, and "A" is selected from an unsubstituted or substituted ($C_0$–$C_6$) alkylene, wherein the substituent is independently selected from ($C_1$–$C_3$) alkyls and halogens, or from a carbonyl (—CO—), carbonylaminos (—CO—NE—, where "E" hydrogen, hydroxyl, or ether), alkylenecarbonylaminos (e.g. —($CH_2$)$_x$—CO—NE—, where x is an integer), carbonylaminoalkylenes (e.g. —CO—NE—($CH_2$)$_x$—), or alkylenecarbonylaminoalkylenes (e.g. —($CH_2$)$_x$—CO—NE—($CH_2$)$_x$—); and "D" is a hydrogen proton or a salt moiety selected from aluminum, calcium, iron, lithium, magnesium, potassium, sodium, titanium and zinc ions. When in a salt moiety, the substituents are such that results in an electronic balance for the substituent group. The "A" is an ($C_0$–$C_6$) alkylene, e.g., nothing, methylene, ethylene, propylene, butylene, pentylene or, hexylene. However, such alkylenes can have a ($C_1$–$C_3$) alkyl substituent, e.g.. methyl, ethyl, or propyl. The halogen which can be a substituent on an alkyl chain herein is selected from bromine, chlorine, and fluorine atoms. Such halogens can be substituents on the alkylene chain also. When "A" is represented as —C(=O)— N(—E)— then E is hydrogen, hydroxyl, or ether; preferably hydrogen. The nitrogen, N, can also be a quaternary nitrogen including, but not limited to, combinations of the groups above. For example, when D is sodium, —$SO_3$—D can be represented as —$SO_3^-Na^+$. When D is an alkyl group, —$SO_3$—D can be represented as —$SO_3CH_3$.

Non-limiting examples of the substituent groups are:

I. Phosphonate Substituents

—PO₃H₂      —PO₃(CH₃)₂      —PO₃(H)(CH₃)
—CH₂PO₃H₂      —CH₂PO₃(C₃)₂      —CH₂PO₃(H)(CH₃)
—C(=O)NHCH₂PO₃H₂

II. Sulphonate Substituents

—C(=O)NHCH₂SO₃H
—C(=O)NHC(CH₃)₂CH₂SO₃H
—CH₂C(=O)NHC(CH₃)₂CH₂SO₃H
—CH₂C(=O)N(CH₃)C(CH₃)₂CH₂SO₃H

III. Cationic or Neutrally Charged Amide Substituents

—C(=O)NH₂      —CH₂C(=O)NH₂
—C(=O)NHCH₃      —C(=O)N⁺(CH₃)₃

Preferably, the molecular weight of the composition having the above core and substituents ranges from about 100,000 to about 20,000.000. When produced without the optional cationic or neutrally charged amide substituent, the more preferred molecular weight ranges from about 500,000 to about 5,000.000. When produced with the optional cationic or neutrally charged amide substituent, the more preferred molecular weight is about 500,000 to about 5,000.000.

The composition of the present invention can be produced with varying proportions or ratios of the molar units of the phosphonated substituents, the sulfonated substituents, and the optional cationic or neutrally charged amide substituents. The molar unit ratio of phosphonated substituents to sulfonated substituents can range from about 99/1 to about 1/99, but is preferably from about 45/55 to about 1/99, more preferably from about 10/90 to about 1/99. When the optional cationic or neutrally charged amide substituents are present in the produced polymer, such substituents are preferably predominate in proportion to the other substituents, preferably in a ratio of about 1/1, more preferable about 10/1 or higher relative to the phosphonated substituent. The ratio of the other two substituents to each other can remain as stated hereinabove. Accordingly, a preferred molar unit ratio of (cationic or neutrally charged amide substituents) to (sulphonated substituents) to (phosphonated units) is (from about 70 [preferably about 85] to about 90) molar units of cationic or neutrally charged amide substituents to (from about 0[preferably about 10] to about 30) molar units of sulphonated substituents to (from about 0[preferably about 5] to about 10) molar units phosphonated units. For examples, molar unit ratios of cationic or neutrally charged amide substituents/sulphonated units/phosphonated units of 85/10/5, 89/10/1 and 90/9/1. Other exact ratios arc also preferred when in the stated ranges. While the sequencing of the units may vary according to the intended use, there is no general requirement or preference and the invention is not to be limited to any particular sequence illustrated herein. Additionally, the terminal units of the polymer, as well as other units and substituents, can be other than the units or substituents described as long as the presence of such does not interfere with the benefits of the present invention. Similarly, some degree of cross-linking may occur, but preferably is substantially absent.

In one preferred embodiment of the present invention the phosphonated substituent can be described as having the chemical structure of —PO₃H; the sulphonated substituent as having the chemical structure of —C(O)NHC(CH₃)₂CH₂SO₃H; and the cationic or neutrally charged amide substituent as having the chemical structure of —C(O)N₂.

Such polymer can be synthesized by the polymerization of varying proportions of vinylphosphonic acid monomers; 2-acrylamido-2-methylpropanesulfonic acid monomers; and acrylamide monomers. The following Table 1 is a non-limiting illustration of the polymers and molecular weights possible. (Molecular weights can be determined by an intrinsic viscosity method, such as one using Mark-Houwink-Sakurada constants.)

TABLE 1

| Polymer Composition | Molecular Weight |
|---|---|
| 99% AMPS 1% VPA | 75,000 |
| | 125,000 |
| | 500,000 |
| 89% PAM 10% AMPS 1% VPA | 500,000 |
| | 2,000,000 |
| | 5,000,000 |
| 85% PAM 10% AMPS 5% VPA | 75,000 |
| | 500,000 |
| | 2,000,000 |
| | 5,000,000 |

AMPS = 2-acrylamido-2-methylpropanesulfonic acid monomers
VPA = vinylphosphonic acid monomers
PAM = polyacrylamide monomers A non-limiting, example of one of the polymers of the present invention can be exemplified by the following polymer segment structure:

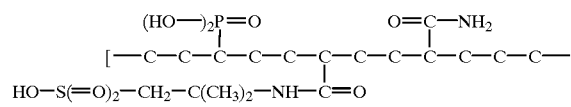

In a preferred embodiments the phosphonated substituents are effective for bonding with a mineral filler. Such mineral fillers can be those typically used in paper making applications. Non-limiting examples of such fillers are clays, calcium carbonates (such as ground carbonates or precipitated calcium carbonates), and talcs. As will be understood, the phosphonated substituent(s) used and its(their) effectiveness will vary according to the type of paper making materials (e.g. pulps and/or fillers) and manufacturing conditions (e.g. temperatures, pressures, other chemicals) applied. "Bonding" as used herein may include either or both of an acid-base interaction and ionic bonding to create a useful amount of affixation or affinity between the polymer and the mineral filler for the intended utility. Accordingly, bonding can be, but need not be, indicated by secondary measurements, such as retention or strength measurements in paper applications.

In a preferred embodiment, the sulphonated substituents are effective for bonding with a polysaccharide material. Such polysaccharide material can be those typically used in paper making applications, such as starches, fibers, thickening agents and the like. Non-limiting, examples of such fiber materials are wood, bamboo, bagasse or other cellulosic biomass. Starch examples are cationic or neutral waxy maize, potato, tapioca, converted or chemically modified starch, synthetic starch, and the like. Thickening agents are the carboxymethyl family of thickeners and the like.

In another embodiment, the present invention is a polymer wherein the phosphonated substituents are effective for bonding with a mineral filler used for non-paper applications. In such application, the mineral filler is used in a composition which also contains material bonding with the sulphonated substituent of the polymer. Such non-paper applications can include, but are not necessarily limited to, applications involving natural and synthetic rubbers, sealants, plastics, paints (e.g. latex and emulsified), rheology modifiers, pharmaceutical tablets, etc. Such materials can include casted or extruded non-paper materials containing cellular or polymeric or polysaccharide material suitable for effective bonding with the sulphonated substituent, such as fillers useful or bulk or strength purposes.

The selection and amount of the optional cationic or neutrally charged amiiide substituent for reducing the electrostatic charge density and for hydrogen bonding will vary according to the selection of the phosphonated and sulphonated substituents.

In another embodiment the present invention is a polymeric composition comprising the novel polymers described hereinabove, which polymeric composition can have wide and varying characteristics relating to average molecular weights, molecular weight distributions, charge density, and type of monomeric units. Depending on the application, these characteristics can be adjusted. For instance, in a desired application the average molecular weight might be 1,000.000 with 85% of the polymers having a molecular weight of 1,000.000±15%. As a further example, in another application, 85% of the polymers might have a molecular weight of 1,000,000±50%.

Polymers can be classified as straight polymers and cross-linking polymers. Using known methods of analysis, such as Nuclear Magnetic Resonance Spectrocopy (NMR), the degree of cross-linking polymers (as a weight percent of the total composition) can be ascertained. In a preferred embodiment, the polymer composition of the present invention has a low degree of cross-linking and contains less than about 15 weight percent, more preferably, less than about 5 weight percent; and even more preferably, less than about 1 weight percent of cross-linking polymers.

In another embodiment of the present invention, instead of the phosphonated substituted having the above-described structure, the composition of the present invention has in lieu thereof a substituent comprising a derivative of a condensed phosphate, such as of a polyphosphate, pyrophosphate, or polyphosphoric acid (e.g. such as pyrophosphoric acid, metaphosphoric acid, superphosphoric acid or orthophosphoric acid).

In another aspect, an embodiment of the present invention is a method for improving the strength in paper comprising the addition of certain polymer's compositions of the above polymer to a paper furnish optionally containing fillers. The preferred polymers are copolymers comprising acrylamide monomers and phosphonated monomers or sulphonated monomers or are terpolymers comprising acrylamide monomers, phosphonated monomers and sulphonated monomers. The addition of the polymer composition can be prior to the headbox of a paper machine in either the thick or thin stock. Split or multiple addition points and other strategies can be used. The amount added will vary according to the nature of the papermaking furnish and the intended use of the paper produced, but should be typically in the range of from about one pound to about five pounds of polymer composition per ton of furnish.

Unexpectedly, the polymer of the present invention in admixture with starch provides a synergistic increase in the strength of the paper produced. In one aspect, the synergistic effect is signified by the fact that no amount of either additional polymer or starch, when used alone, can provide an equivalent result to the combination of polymer and starch. The starch useable are those typically useable for papermaking. Such starch can be synthetic, such as ethylated or oxidized forms; or organic, such as potato based, preferably cationic potato starch, or corn based, such as cationic waxy maize. When both polymer composition and starch are added to paper furnish, the points of addition for each can be at various points upstream of the headbox. The polymer is preferably added to the thick stock and preferably before the addition of the starch. Split addition of each can be performed. Use of such polymers alone and in combination with starch improves the strength of paper formed with the polymers. Such strength improvement can conveniently be measured using known methods, such as breaking length, mullen burst and Scott bond methods.

Accordingly, one embodiment of the present invention is a process for the production of paper comprising the admixing of starch and a polymer composition comprising one or more polymers of the group consisting of acrylamide polymers, acrylamide polymers co-polymerized with a monomer containing a pendent sulfonic acid group or a phosphonic acid a group, and terpolymers of acrylamide co-polymerized with both a monomer containing a pendant sulfonic acid group and a monomer containing pendant phosphonic acid group. Such admixing occurs prior to or during the preparation of the furnish before providing the furnish to the paper machine. The sequence of the admixing can be before, during or after the addition of the starch and polymer compositions to the furnish, preferably before. When the starch and polymer composition is added to the furnish separately, the preferred order is to add the starch first. The polymer compositions are those described hereinabove.

The preferred process comprises effectively admixing the starch and polymer compositions to produce a paper sheet having a strength unexpectedly significantly greater than when either the starch or polymer composition is used alone, preferably at least about 15% greater, more preferably at least about 50% greater. Even more preferably at least about 100% greater.

In another aspect, an embodiment of the present invention is a process comprising effectively admixing the starch and polymer composition to produce a paper sheet having an unexpected synergistic increase in strength over the strength when either starch or polymer composition is used alone. Such "Synergistic Increased" is measured by comparing the strength attained by the combination of starch and polymer composition over the absence of both starch and polymer composition in comparison to the additive sums of the separate increases in strength of each of the starch and polymer composition alone over the absence of both starch and polymer compositions in the formed paper. Stated in the form of an equation:

$$SI=[(SC-SA)/(SA)]-[(SS-SA)/(SA)+(SP-SA)/(SA)],$$

wherein SI is the synergistic increase, SC is the strength of the paper with the combination of starch and polymer composition, SA is the strength of the paper in the absence of either starch or polymer composition, and SS and SP are the respective strengths of paper with starch and polymer composition alone. The presence of a meaningful value of SI (e.g. that over experimental artifacts) is considered significant and unexpected as indicative of a result better than additive effects. In a preferred embodiment, the synergistic increase is one such that no amount of additional polymer or starch alone when singularyly present will provide the equivalent strength provided by the inventive combination of polymer and starch for a given weight percent of inorganic (e.g., filler) material.

The amount of starch useable will vary in accordance with the particular furnish and paper being produced. Such amounts can typically range from about five to about fifty pounds per ton of paper. Similarly the amount of the polymer composition can typically range from about one to about ten pounds per ton of paper.

The following examples are illustrations of methods of making the present inventions but are not intended to be limiting examples inasmuch as other methods are possible.

EXAMPLE 1
Preparation of Polyacrylamide 4083 milliliters of distilled water and 500 grams of acrylamide (97% pure by weight) are charged to a flask. The material is stirred while purging with nitrogen gas (commercial grade) for 5 minutes. The flask contents is heated to 70° C. and the nitrogen purge is continued with the addition of a potassium persulfate solution (0.083 grams potassium persulfate and 83.3 milliliters of distilled water). The flask contents is held at 70° C. for one hour, then the temperature is elevated to 80° C. until thickening commences. The temperature is reduced to 75° C. After 30 minutes, the temperature is set to 80° C. for one hour. A second potassium persulfate solution (0.333 grams of potassium persulfate and 83.3 milliliters of distilled water) is added. 3–4 minutes later, a sodium metabisulfite solution (0.167 grams of sodium metabisulfite and 83.3 milliliters of distilled water) is added. The flask temperature is held at 80° C. while distilled water (of a 4167 milliliter amount) is added in amounts to avoid thickness. The flask is held at 80° C. with water addition for about an hour, at which time a sampling is checked for residual monomer presence. If residual monomer presence is too much, continue holding at 80° C. until monomer amount is acceptable. Then add remaining water (of 4167 ml.) and mix well. Cool and recover.

EXAMPLE 2
Preparation of Polyacrylamide/AMPS (2-acrylamido-2-methylpropanesulfonic acid)

4080 milliliters of distilled water 368 grams of acrylamide (97% pure by weight); and 60 grams of sodium AMPS solution (50% AMPS) are charged to a flask. The material is stirred while purging with nitrogen gas (commercial grade) for 5 minutes. The flask contents is heated to 70° C. and the nitrogen purge is continued with the addition of a potassium persulfate solution (0.083 grams potassium persulfate and 83.3 milliliters of distilled water). The flask contents is held at 70° C. for thirty minutes or until reaction commences. If no reaction within thirty minutes, then the temperature is elevated to 80° C. and addition of feed solution [203.2 grams sodium AMPS (50%) and 291.4 milliliter distilled water] is begun at rate of 11 grams per minute. Add up to 3747 milliliters of distilled water as thickening occurs. After addition of feed, watch temperature for exothermic conditions. A second potassium persulfate solution (0.333 grams of potassium persulfate and 83.3 milliliters of distilled water) is added. 3–4 minutes later, a sodium metabisulfite solution (0.167 (grams of sodium metabisulfite and 83.3 milliliters of distilled water) is added. The flask temperature is held at 80° C. while distilled water (of a 4167 milliliter amount) is added in amounts to avoid thickness. The flask is held at 80° C. with water addition for about an hour, at which time a sampling is checked for residual monomer presence. If residual monomer presence is too much, continue holding at 80° C. until monomer amount is acceptable. Then add remaining, water (of 3747 ml), and additional water (up to 500 ml) if needed, and mix well. Cool and recover.

EXAMPLE 3
Preparation of AMPS/PAM/VPA Terpolymer

A flask is charged with 145.0 milliliters of distilled water, 21.75 grams of acrylamide and 4.0 grams of sodium 2-acrylamido-2-methylpropanesulfonic acid monomer (50%) and heated under nitrogen to 70° C. Add approximately 1 gram solid sodium hydroxide to adjust pH to about 7. Then 0.005 grams of potassium persulfate in 5 milliliters distilled water is added and the temperature permitted to rise to 80° C. As mix thickens, add 5 milliliters distilled water. Over a period of about one hour add a feed of 25.0 milliliters distilled water, 11.78 grams of sodium 2-acrylamido-2-methylpropanesulfonic acid monomer (50%), and 0.40 grams of vinylphosphoric acid monomer, together with 2.4 grams of a 10% sodium hydroxide solution to adjust the pH of mix to about 7. As mixture thickens add distilled water (approximately 90 milliliters total over addition period). Fifteen minutes after addition of feed, add 15 milliliters of distilled water. About thirty minutes later, add 0.2 grams of potassium persulfate together with 5 milliliters of distilled water, after 3–4 minutes, add 0.1 grams sodium metabisulfite together with 5 milliliters of distilled water. Maintain the temperature of the mixture remains at about 80° C. Add 200.0 grams of cold distilled water. Continue heating to elevate to 80° C. and continue mixing for approximately three hours. Recover. Sample analysis: 5.88% solids, 0.069% residual monomers; 3.4027 intrinsic viscosity (e.g. Mark-Houwink-Sakurada Constants); molecular weight of 999,024.65.

EXAMPLE 4
Use Of Polymers in Papermaking

Handsheets were made using a 75% hardwood/25% softwood blend of bleached northern Kraft pulps, co-refined at 1.6% consistency to an endpoint of 400 Canadian Standard Freeness. The refined pulp was diluted to 0.3 125% consistency for papermaking,. Hercon 75 cationic alkyl ketene dimer emulsion was added to the furnish at the rate of 0.25%. Polymer consisting of either unfunctionalized polyacrylamide, copolymer of acrylamide and 2-acrylamido-2-methylpropanesulfonic acid (AMPS) or a terpolymer of the PAM, AMPS and vinylphosphonic acid (VPA) was added to the furnish at the rate of 0.25% when specified. Albacar® HO precipitated calcium carbonate was added to the furnish batch for each set of handsheets in amounts adjusted to achieve filler levels of approximately 14, 21, and 28%. Stalok 400 cationic potato starch was added to the furnish at 0.75% when specified. Reten 1523 anionic polyacrylamide retention aid was added to the furnish at the rate of 0.025%. Each furnish batch was then divided into four aliquots to produce 2.5 cram handsheets (60.6 g/m$^2$). After each handsheet was formed on the Formax (Noble & Wood type) sheet former, it was pressed between a stainless steel roll and a rubber roll at 20 psi, while sandwiched between pieces of paper machine "wet felt" material. These handsheets were dried on a 115° C. drum dryer, then conditioned and tested under TAPPI standard conditions of 23° C. and 50% relative humidity. The results of the testing are shown in FIGS. 1 and 2.

EXAMPLE 5
Glass Transition Temperatures

Differential scanning, calorimetry analysis was performed on five polymer composition sample to determine the presence of singular glass transition temperatures. The results are presented in the following table:

| Sample No. | Molecular Weight | AMPS | PAM | VPA | Glass Transition Temperature |
|---|---|---|---|---|---|
| 1 | 2,100,000 | — | 100 | — | 120.9 |
| 2 | 1,800,000 | 10 | 90 | — | 110.93 |
| 3 | 1,000,000 | — | 90 | 10 | 78.78 |
| 4 | 500,000 | 10 | 85 | 5 | 83.63 |
| 5 | 1,000,000 | 10 | 89 | 1 | 96.87° C. |

Molecular weights determined by intrinsic viscosity method.
AMPS - weight percent 2-acrylamido-2-methylpropane sulfonic acid.
PAM - weight percent polyacrylamide.
VPA - weight percent vinylphosphonic acid.

What we claim is:

1. A paper composition comprising (a) a cellulosic fiber for paper production and a mineral filler, said cellulosic fiber being present in an amount suitable for making paper, and (b) a composition comprising a polymeric core; one or more phosphonated substituents effective for bonding with said mineral filler; and one or more sulphonated substituents effective for bonding with said cellulosic fiber; and, optionally, one or more cationic or neutrally charged amide substitutents for reducing the electrostatic charge density of the composition and for hydrogen bonding wherein the ratio of phosphonated to sulfonated substituents is between 99/1 to 1/99.

2. The paper composition of claim 1 further comprising starch.

3. The paper of claim 2 wherein the starch is ethylated or oxidized starch or potato based or corn starch.

4. The paper composition of claim 3 wherein the starch is an effective admixture of the starch and a composition comprising a polymeric core; one or more phosphonated substituents effective for bonding with a polysaccharide material; and optionally, one or more cationic or neutrally charged amide substituents for reducing the electrostatic charge density of the composition and for hydrogen bonding, wherein the mixture is effective to produce a paper sheet having a strength significantly greater than when either the starch or polymer composition is used alone.

5. A paper sheet comprising the composition of claim 4 wherein the effective admixture produces a paper sheet having a significant increase in strength over the strength when either starch or polymer composition is used alone.

* * * * *